Aug. 19, 1969   D. F. STEWART   3,461,501
BLOWN TUBULAR FILM DIES

Filed April 18, 1967   2 Sheets-Sheet 1

INVENTOR.
DONALD F. STEWART
BY *Philip R. Arvidson*

AGENT

INVENTOR.
DONALD F. STEWART

# United States Patent Office 3,461,501
Patented Aug. 19, 1969

3,461,501
BLOWN TUBULAR FILM DIES
Donald F. Stewart, Florham Park, N.J., assignor to Allied Chemical Corporation, New York, N.Y., a corporation of New York
Filed Apr. 18, 1967, Ser. No. 631,816
Int. Cl. B29d 23/04; B29f 3/00
U.S. Cl. 18—14                                4 Claims

ABSTRACT OF THE DISCLOSURE

This application relates to a new type of die for extruding tubular film, the new feature of said die being a flexible circular die ring which forms the outer surface of an annular extrusion orifice through which the tubular film is extruded. The die ring is perforated in such a manner as to allow the ring to flex inwardly when force is exerted upon its outer surface, thus allowing fine adjustment of the thickness of the tubular film being extruded around the entire periphery thereof.

BACKGROUND OF THE INVENTION

Field of the invention

This application broadly relates to the production of tubular film and more specifically deals with apparatus for adjusting the thickness of such film as it is extruded.

It is an object of this invention to provide a simple, relatively inexpensive, readily adjustable extrusion die for extruding tubular film with minimum thickness variation.

It is another object of this invention to provide a flexible die ring adapted for use in known tubular film dies, which die ring allows extrusion of superior film.

Other and further objects will be apparent to those skilled in the art from a reading of the following specification and claims.

Description of the prior art

It is known in the art of producing tubular film to produce such film by extruding it through the annular orifice formed between two concentric rings. Such prior art procedures have generally utilized a fixed inner ring, usually called a mandrel, and an outer ring movable with respect thereto so as to allow substantially concentric positioning of said outer ring and consequent substantially uniform thickness of the extruded tubular film. However, it has been found that such apparatus does not permit as fine an adjustment as is desirable of the thickness of the film around the periphery thereof.

One of the reasons why a more uniform film is desirable is that, when wound on a roll, such a film gives a more pleasing appearance and is thus more saleable. There are known methods of extrusion which can be used in lieu of a fine adjustment to achieve a better looking roll of film. One such method uses a continuously rotating or oscillating die through which the film is continuously extruded. By such rotation the position of any variations in the thickness of the film around the periphery thereof is continuously shifted over the surface of the film, thus achieving a better looking roll of film when the film is wound. Another known method, which is similar to the rotating die method, uses a rotating extruder. By continuously rotating or oscillating the extruder while extruding film a continuously varying flow pattern is set up through the die, thus continuously varying the position of any variation in thickness of the film over the periphery of the film and consequently resulting in a better looking roll of film when the film is wound. Both of these methods have the disadvantages that they require costly equipment and are complicated in practice. Furthermore, they are merely directed to the symptoms of the problem, i.e. they distribute thickness variations over the surface of the film so as to minimize shading variations on the roll, rather than attacking the root of the problem by minimizing the thickness variations.

I have now developed a tubular film die which incorporates an outer die ring which is not only movable so as to be substantially concentric with the mandrel, thus allowing coarse adjustment of the film thickness but is also preforated in such a manner as to render it flexible with respect to the mandrel so as to allow fine adjustment around the entire periphery of the film of the thickness of the tubular film being extruded.

SUMMARY

My new tubular film die consists of a fixed die ring or mandrel and a concentrically adjustable, flexible outer died ring positioned therearound. The outer die ring has a series of spaced perforations therethrough, the perforations being perpendicular to the plane of the ring and each perforation extending from near the inner surface of the ring outward through the outer surface of the ring. Spaced outward from and concentrically surrounding the outer surface of said outer die ring is a second fixed ring having threaded adjusting bolts protruding through threaded holes therein into contact with the outer surface of said outer die ring. By appropriate positioning of the adjusting bolts the outer die ring can be moved so as to position it concentric with the inner die ring. When such concentric positioning has been achieved the outer die ring is fixed firmly in place by tightening bolts which extend through the outer died ring in a direction perpendicular to the plane thereof. After the outer die ring has been securely bolted in place further adjustment of the annular extrusion orifice can be achieved by exerting forces on the outer surface of said outer die ring by means of the adjusting bolts so as to cause said outer die ring to flex and thus achieve a fine adjustment of the orifice thickness.

My novel blown tubular film die thus has the advantages that (1) coarse adjustment of the thickness of the blown tubular film can be effected by moving the entire outer die ring with respect to the mandrel so as to render it substantially concentric therewith and (2) the perforated outer die ring, after its initial concentric positioning for coarse adjustment, can be firmly fixed in place and then finely adjusted by exerting forces on the outer periphery thereof so as to flex the drilled and slotted ring inward at the desired points to allow fine adjustment of the thickness of the tubular film at various points around its periphery. Furthermore, my die is simple and inexpensive and results in a superior film which can be produced more economically than with prior art dies.

DETAILED DESCRIPTION

My novel process will be more specifically described by reference to the above-mentioned drawings.

Figure 1:
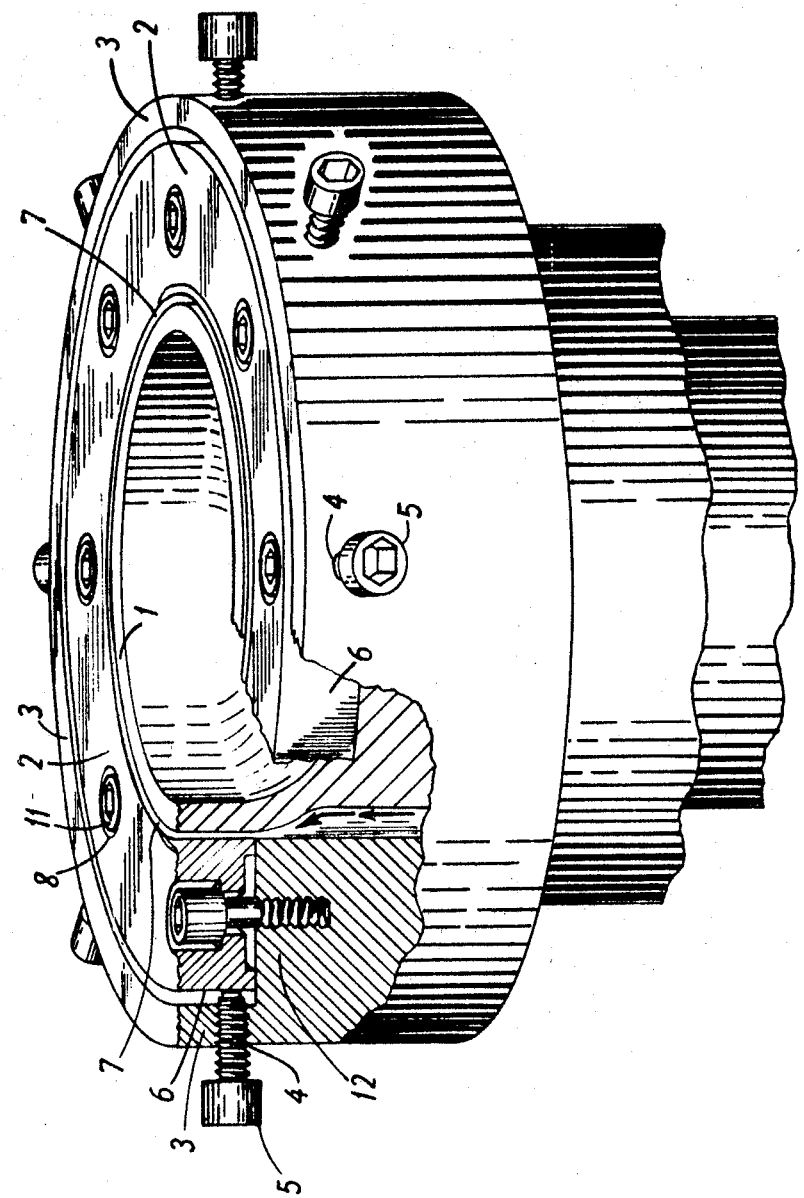
FIGURE 1 of the drawings is a perspective view of a prior art type of tubular film die. Certain parts have been broken away and shown in section for purposes of clarity.

Referring to FIGURE 1, reference numeral 1 denotes a fixed inner mandrel. Reference numeral 2 denotes an adjustable die ring which can be moved with respect to mandrel 1 so as to allow it to be positioned concentrically therewith. Reference numeral 3 denotes a second fixer ring surrounding said adjustable ring 2 and extending thereunder as shown at 12. Fxed ring 3 has threaded holes 4 therein at spaced points therearound. Adjusting bolts 5 are positioned in each of holes 4. Adjusting bolts 5 can be moved inwardly so as to bear against the outer surface 6 of the adjustable die ring 2. By appropriately adjusting bolts 5 against the outer surface 6 of adjustable die ring 2, die ring 2 can be concentrically positioned with respect to mandrel 1 so as to provide an annular orifice 7 of substantially uniform thickness therebetween. When adjustable die ring 2 has been positioned concentrically with respect to mandrel 1 it can be firmly fixed in placed by tightening bolts 11, which are inserted through holes 8 in ring 2 and extend into flange 12 of fixed ring 3.

Figure 2:
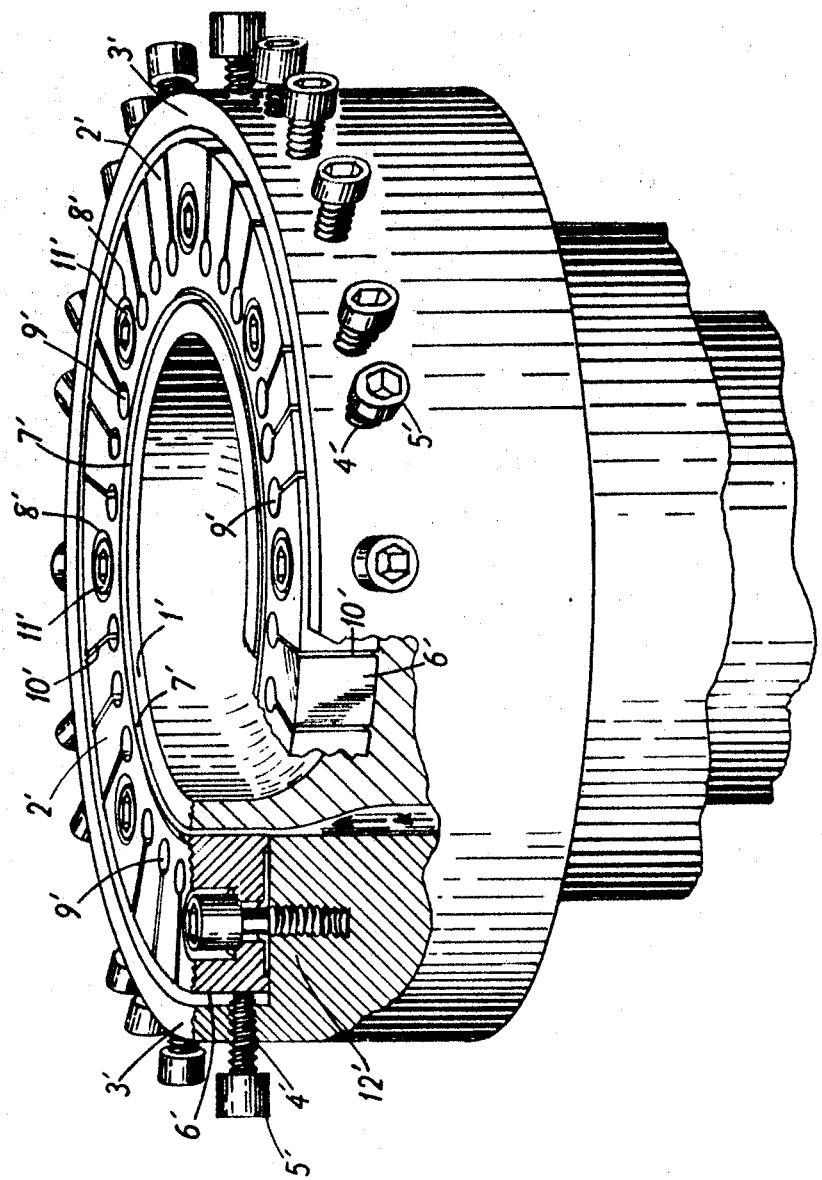
FIGURE 2 is a perspective view of the tubular film die of this invention. Certain parts have been broken away and shown in section for purposes of clarity.

Referring more particularly to FIGURE 2, upon which corresponding parts have been indicated by corresponding numerals, reference numeral 1' indicates a fixed inner mandrel. Reference numeral 2' indicates a perforated outer die ring positioned therearound and moveable with respect thereto. Reference numeral 3' indicates a fixed ring positioned around outer die ring 2' and extending thereunder as shown at 12'. At spaced points around the periphery of fixed ring 3' are threaded holes 4' which receive adjusting bolts 5' which protrude through ring 3' so as to bear against the outer surface 6' of die ring 2'. In use of the die, outer die ring 2' is first positioned substantially concentrically with respect to mandrel 1' by appropriate positioning of adjusting bolts 5' against the outer surface thereof so as to achieve a substantially annular opening 7' between mandrel 1' and die ring 2'. When a substantially uniform annular opening 7' has been achieved, ring 2' is firmly fixed in position by tightening bolts 11' which extend through openings 8' in ring 2' into flange 12' or fixed ring 3'. After ring 2' has been tightened in place, a trial run of tubular film is extruded through orifice 7', as indicated by the flow arrows, in order to determine where fine adjustment needs to be made in the thickness of annular orifice 7'. When it has thus been determined by examining the extruded film where the thick and thin spots are in annular orifice 7', adjusting bolts 5' can be adjusted so as to flex the inner surface of adjustable ring 2' so as to achieve the desired thickness of annular film at all points around its periphery. The flexing of ring 2' so as to achieve fine adjustment is allowed by the fact that the ring has been rendered more flexible by perforating it. Unperforated prior art die rings were either too rigid to permit fine adjustment by flexure or else tended to push out in one place when flexed inward in another. I have found that by perforating the die ring such problems are avoided. The die ring is perforated preferably by drilling holes 9' in it perpendicular to the plane thereof at spaced points therearound and also slotting the ring outwardly from said holes 9' to the outer surface 6' thereof as shown at 10'.

I have found that by using my perforated outer die ring I am able to extrude film having a smaller range of thickness variation, thus resulting in a more saleable film and a film which can be produced and sold more cheaply. For example, I have found that when trying to extrude a 0.75 mil film of polyvinyl chloride use of the prior art type of die, which has been described earlier in the specification, resulted in a film thickness variation from 0.58 to 0.85 mil. When using my novel die the film thickness variation was controlled within 0.68 to 0.82 mil. Obviously the smaller variation in film thickness which can be achieved by using my novel die results in savings of extrudate and results in consequent cost savings in the extrusion process. For example, in the above example about 8–10% savings in materials was achieved resulting in an 8–10% cost reduction. Furthermore, the film which results from the use of my novel die is easier to sell in that it has a more desirable appearance when wound on a roll, giving less color variation across the roll due to the smaller variation in film thickness. Also with certain types of film a package of superior appearance results from use of my die.

While the invention has been described with particular reference to a specific embodiment, it is to be understood that it is not to be limited thereto but is to be construed broadly and restricted solely by the scope of the appended claims. For example, although the invention has been described with reference to a preferred die ring which is perforated by holes extending perpendicularly through it and slots extending from each hole outward through the periphery of the die ring, it will be obvious to those skilled in the art that other types of perforation of the ring could also be used. For example, slots alone or slots extending outwardly from holes which are not perpendicular to the plane of the die ring could be used.

I claim:

1. In a die for producing tubular film comprising a fixed inner mandrel, a die ring positioned therearound and movable with respect thereto, a fixed ring surrounding said die ring, adjustment means attached to said fixed ring, said means bearing against the outer surface of said die ring so as to allow adjustment of said die ring with respect to said fixed mandrel so as to be substantially concentric therewith and provide an annular orifice of substantially uniform thickness therebetween, and holding means operative to firmly fix said die ring in said substantially concentric position, the improvement comprising perforation means at spaced points around said die ring rendering said die ring flexible so as to allow for fine adjustment of the thickness of said annular orifice by distortion of said die ring upon further adjustment of said adjustment means.

2. The die of claim 1 wherein said perforation means extend through said outer surface of said die ring.

3. The die of claim 1 wherein said perforation means comprise holes through said die ring and a slot extending from each hole outward through the outer surface of said die ring.

4. The die of claim 3 wherein said adjustment means are threaded bolts extending through said fixed ring, and said holding means are threaded bolts extending through said die ring into said fixed ring.

References Cited

UNITED STATES PATENTS

| 2,859,476 | 11/1958 | Lainson. |
| 3,311,952 | 4/1967 | Kovach et al. |
| 3,323,172 | 6/1967 | Pierson et al. |

FOREIGN PATENTS

| 1,319,817 | 1/1963 | France. |

WILLIAM J. STEPHENSON, Primary Examiner

U.S. Cl. X.R.

18—12